Figure 3:
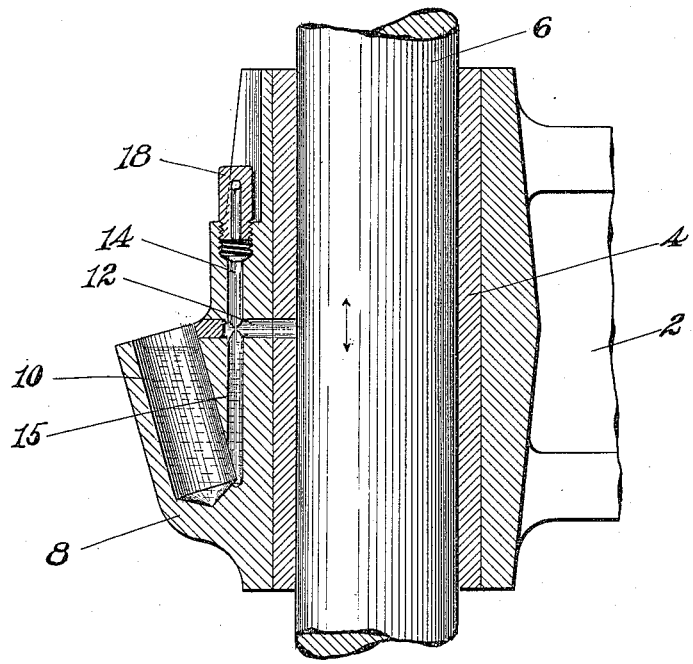

A. M. ALEXANDER.
LUBRICATING APPARATUS.
APPLICATION FILED MAR. 13, 1912. RENEWED JUNE 7, 1915.

1,157,359.

Patented Oct. 19, 1915.
3 SHEETS—SHEET 1.

WITNESSES
Elizabeth C. Coupe
Edith C. Hollrook

INVENTOR
Alexander M. Alexander
By his Attorney,
Nelson W. Howard

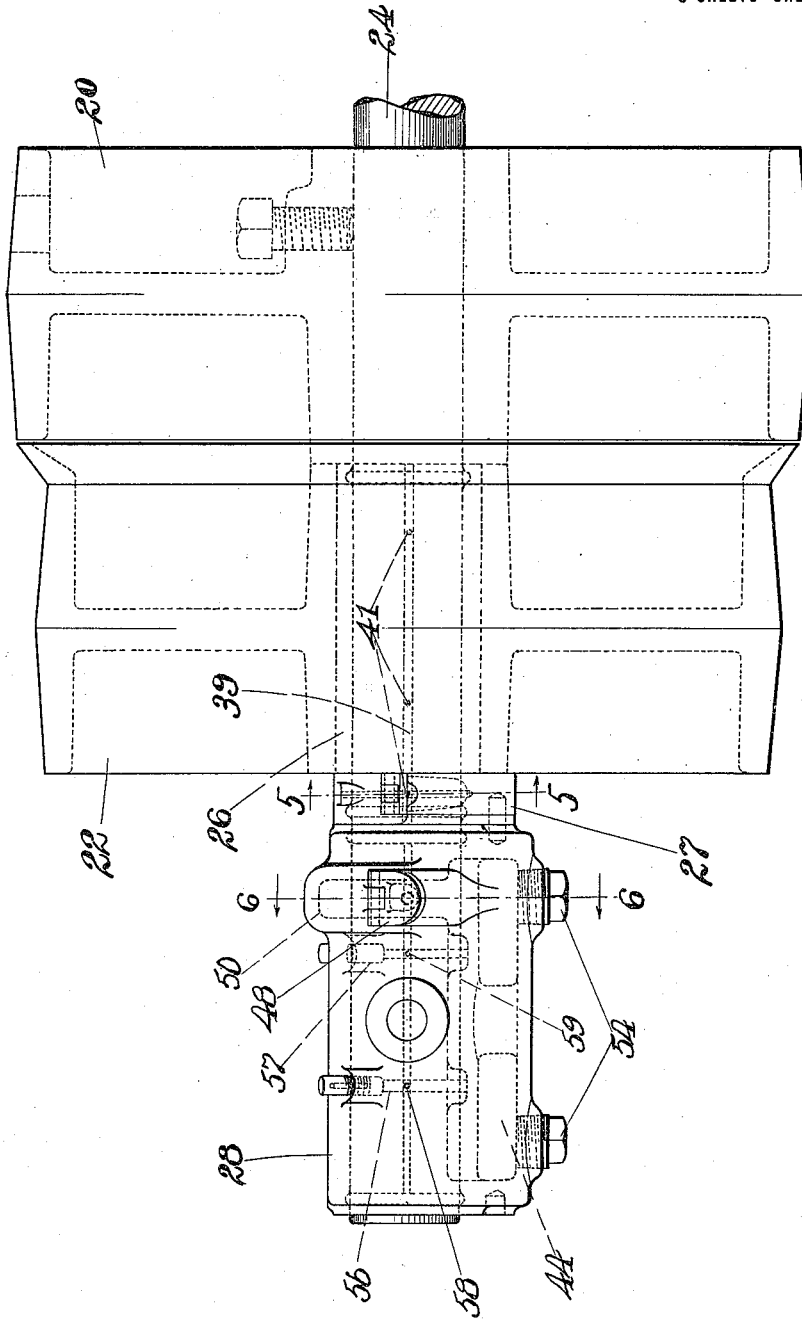

A. M. ALEXANDER.
LUBRICATING APPARATUS.
APPLICATION FILED MAR. 13, 1912. RENEWED JUNE 7, 1915.

1,157,359.

Patented Oct. 19, 1915.
3 SHEETS—SHEET 3.

UNITED STATES PATENT OFFICE.

ALEXANDER M. ALEXANDER, OF BEVERLY, MASSACHUSETTS, ASSIGNOR TO UNITED SHOE MACHINERY COMPANY, OF PATERSON, NEW JERSEY, A CORPORATION OF NEW JERSEY.

LUBRICATING APPARATUS.

1,157,359.  Specification of Letters Patent.  Patented Oct. 19, 1915.

Application filed March 13, 1912, Serial No. 683,413. Renewed June 7, 1915. Serial No. 32,733.

*To all whom it may concern:*

Be it known that I, ALEXANDER M. ALEXANDER, a citizen of the United States, residing at Beverly, in the county of Essex and State of Massachusetts, have invented certain Improvements in Lubricating Apparatus, of which the following description, in connection with the accompanying drawings, is a specification, like reference characters on the drawings indicating like parts in the several figures.

It is well understood that the function of lubricating materials, (hereinafter for convenience referred to as oil) when applied to friction surfaces, is to separate the surfaces that otherwise would be in direct contact with each other and thus to change the frictional resistance from that produced between the surfaces of solids in direct contact with each other to that produced by the surfaces of solids in contact with a film of oil. While it has generally been considered that the ideal conditions of lubrication could be most nearly approximated by flooding the friction surfaces with oil, on the theory that an abundance of oil insures the constant presence between the surfaces of the desired film, still it has been found that under many conditions better lubrication can be obtained by supplying to the surfaces to be lubricated just enough oil to maintain a thin film between them without providing an excess of oil. Obviously where such conditions exist, the provision of an excess of oil is not only a waste of lubricating material but also causes a waste of energy since the excess of oil actually produces inferior running conditions. Prior to this invention, however, no apparatus has been devised, so far as I am aware, by which oil could be delivered to the friction surfaces in the required quantities necessary to maintain for any substantial length of time the desired lubricating conditions. It is an important object of this invention to devise an apparatus by which this condition of lubrication can readily be maintained. With this end in view, it is proposed to utilize a current of air or other gas to force oil, preferably in the form of a thin film, toward the friction surface. By this arrangement the rate of delivery of oil to the surface to be lubricated can be made just sufficient to maintain indefinitely the required lubricating conditions. It is further proposed to utilize the fluid pressure conditions existing between the friction surfaces to be lubricated to force oil on to these surfaces. I have found that the relative movement of friction surfaces upon each other produces between them fluid pressures differing considerably at different points. When, for instance, a journal rotates in its bearing there is produced around the journal for a considerable angular distance a positive pressure varying in intensity at different points, while around another part of the journal there is produced a region of negative pressure.

The present invention provides an apparatus in which these pressure conditions are utilized to create a current of air or other gas sufficient to force lubricating material, either in the form of a film as above mentioned, or otherwise, to the friction surface to be lubricated.

While many forms of apparatus may be devised to operate in accordance with the present invention, I have shown in the accompanying drawings, for purposes of explanation, certain very simple constructions.

Figure 2:
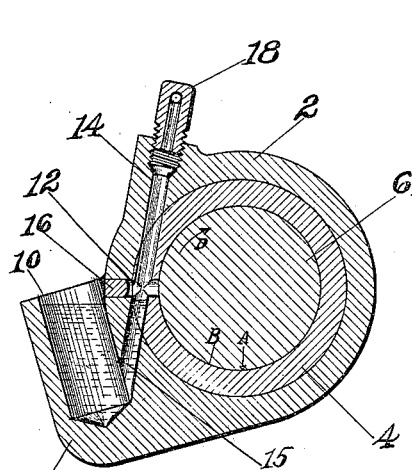
Figure 1:
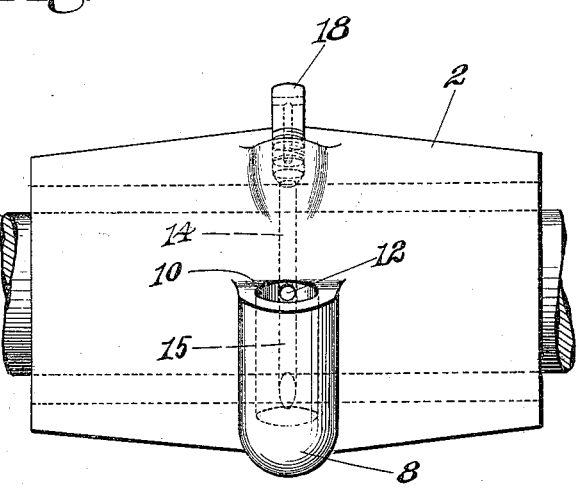
Figure 6:
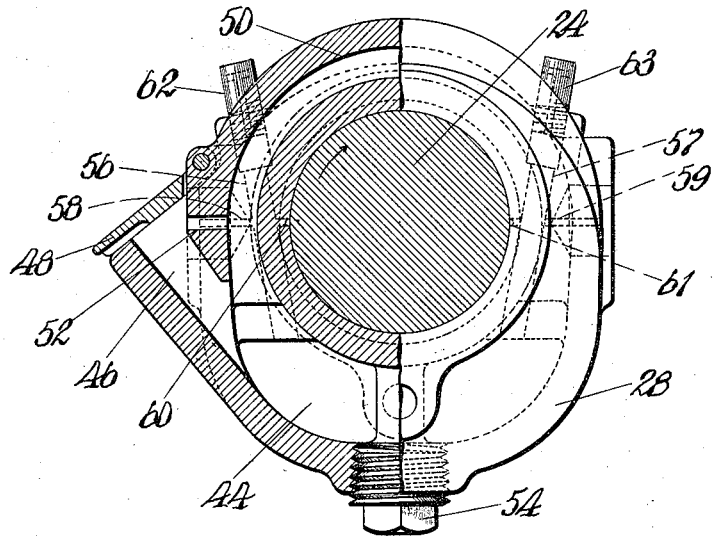
Figure 5:
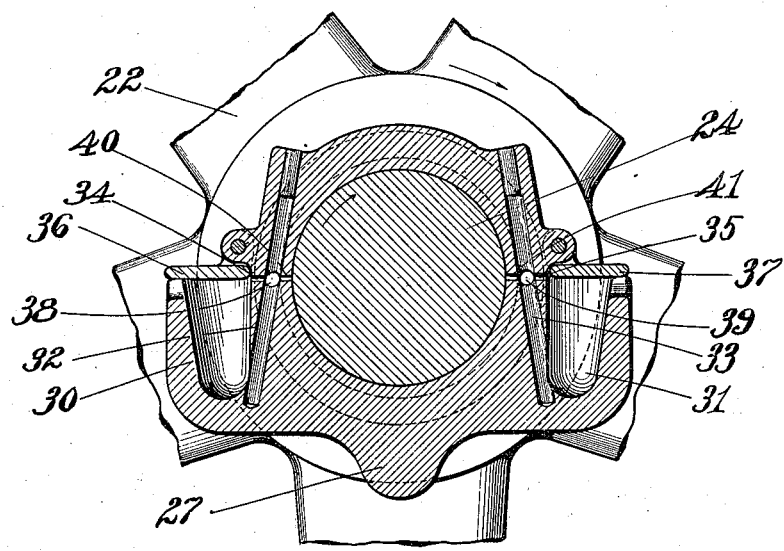

In the drawings, Figure 1 is a view in side elevation of an apparatus designed in accordance with this invention; Fig. 2 is a sectional view of the apparatus shown in Fig. 1; Fig. 3 is a section of an apparatus like that shown in Figs. 1 and 2, but applied to slightly different conditions; Fig. 4 is a view in side elevation of a different apparatus; Fig. 5 is a cross-sectional view on the line 5—5 of Fig. 4; and Fig. 6 is a cross-sectional view on the line 6—6 of Fig. 4.

Referring first to Figs. 1 and 2, 2 indicates a bearing having the usual bushing 4 and supporting a shaft 6 for rotative movement. The bearing is provided on one side with a boss 8 in which a hole is drilled to form an oil pocket or reservoir 10. A small hole 12 is drilled through the casting 2 and bushing 4, substantially in or above the level of the axis of the shaft, and another hole, intersecting the hole 12, is drilled downwardly from the top of the casting until it breaks through into the bottom of the reservoir 10, thus forming ducts 14 and 15. The outer end of one of these holes may be plugged, as indicated at 16, although this is not necessary. The outer end of the other hole, however, should be left open; and, in order to prevent its becoming clogged with dirt, this hole may be tapped and a plug 18 threaded thereinto, the plug having small holes drilled through from the sides, where they will be unlikely to become filled with dirt, and opening into the hole 14. It will be evident that the holes 12 and 15 form a continuous oil duct leading from the oil reservoir to a point on the friction surface of the bushing; and that the ducts 12 and 14 afford free communication between said point and the atmosphere.

In using the apparatus the oil reservoir is filled, causing the oil to rise in the duct 15 to a point somewhat below the duct 12. The upper edge of the reservoir preferably is so positioned with reference to the ducts that the reservoir can not be filled to such a point that the oil will run through the duct 12 on to the friction surface solely through the influence of gravity.

Assuming the shaft to be rotating in the direction indicated by the arrow D in Fig. 2, suction will be created at the point where the duct 12 opens on to the friction surface of the bushing. The lubricating action should be initiated by establishing a film of oil between the friction surface and the surface of the oil in the duct 15. This action may be accomplished by closing the apertures in the plug 18 for an instant, which will cause the oil to flow through the duct 12; or a sufficient film of oil may have been established previously during the machining operations; thus rendering the "priming" operation unnecessary. The suction created by the movement of the shaft 6 will cause a current of air to flow continuously through the duct 14 to its junction with the duct 12 and then along the latter duct to the shaft. This current of air exerts a frictional drag on the film of oil in the duct 12, tending to force or urge it toward the friction surface of the bearing. In this apparatus the oil is delivered to the bearing in exceedingly small quantities, no actual transfer of oil being visible, even in an apparatus constructed to expose all the ducts to view. Yet oil is supplied in sufficient quantities to maintain constantly a thin film between the shaft and the bearing but without providing any excess of oil. After the operation of the apparatus has been initiated by priming, it will continue to operate automatically, starting up when the shaft is started, and stopping when the rotation of the shaft is discontinued, until the oil level drops to such a point that air is admitted through the reservoir to the lower end of the duct 15. The reservoir then should be refilled. Fig. 3 shows the same relative arrangement of ducts and reservoir but applied to a bearing in which a shaft reciprocates axially.

It is important, in an apparatus arranged as above described, to have the oil duct open onto the friction surface of the bearing at a point where negative pressure is created. The distribution of fluid pressure around the journal depends chiefly upon the position of the journal in the bearing, which, in turn, depends upon the direction of rotation of the journal, the direction and intensity of the load which it carries, and the direction and intensity of the force imparted to it by the driving means tending to press it laterally against the friction surface. Referring to Fig. 2, and assuming the shaft 6 to be driven by a belt, the direction of load and direction of belt pull coinciding and both acting to press the shaft against the bearing in the direction indicated by the arrow A, it will be evident that, when the shaft is stationary, the point of maximum positive pressure will be at the point A; but when the shaft is rotated in a clock-wise direction and is supplied with lubricating material, the point of maximum pressure will be shifted slightly toward the left to a point, say at B. The amount of this shifting will depend upon the load, belt pull, and speed. Experiments have demonstrated that, at a point less than 90° ahead (in the direction of rotation) of this point of maximum pressure on the "leaving" side of the journal, that is, the side at which the journal passes out of contact with the friction surface, as distinguished from the side at which it runs into contact with the bearing, the pressure changes from positive to negative; and that from this point a region of negative pressure extends for approximately 180° around the journal. Bearing this fact in mind, and remembering the influence that the belt pull, load and direction of rotation have upon the position of the journal in the bearing, the point at which the oil duct 12 should enter the bearing can usually be determined without difficulty. If, however, a particular case presents difficulty because of opposing factors which, perhaps, may vary in intensity at different times as, for instance, where the belt pull is strong and acts at an angle to a variable load, the point at which the oil duct should be brought into the friction surface can be determined by drilling a few test holes and either observing the action when oil is poured into these holes, or by testing the pressure at the holes with any pressure indicating device. It may be desirable to have several oil ducts enter the bearing at different angular positions.

It will be evident that, if the air duct 14 is closed while the shaft is running, the suction created in the duct 12 will cause the oil to flow very rapidly through the duct 15 and the duct 12 into the bearing, draining the reservoir in a few minutes. Under normal running conditions, however, the air duct is left open and affords free communication between the duct 12 and the atmosphere so that the level of the body of oil in the duct 15 is not appreciably affected by the suction.

The rate at which the oil will be delivered to the friction surface may be varied by varying the velocity of the current of air traveling through the duct 12. Obviously the greater the velocity the greater will be the frictional drag exerted upon the film of oil by the air. The more important factors affecting the velocity of the air entering the bearing are, the speed of the shaft, the dimensions of the ducts through which the air travels, the position of the shaft in the bearing with relation to the position of the oil duct entrance, and the difference in diameter of the shaft and bearing. Furthermore, the flow of air may be increased by forming a notch in the shaft opposite the duct 12 or by forming a groove in the bushing 4 across the end of duct 12 and running parallel with the axis of the shaft.

The rate of delivery of oil to the shaft also depends upon the size and shape of the oil ducts and the height that the oil must be lifted. Experiments conducted with this apparatus indicate that the oil is drawn up the wall of the duct 15, chiefly through the action of surface tension. The current of air in the duct 12, urging the film along this duct, tends to rupture the film near the upper end of the duct 15, while surface tension, tending to maintain the film unbroken, lifts oil from the main body in the duct 15 and draws it slowly up the walls of the duct, thus replenishing the film in the duct 12. I have found that an apparatus arranged as shown in Figs. 1 and 2, in which this duct is circular in cross-section and approximately one sixteenth of an inch in diameter, operates very satisfactorily. The travel of the oil up the walls of the duct 15 may be aided by roughening the walls or by inserting a rod in the duct partially closing it and providing additional surface upon which the oil film may cling.

In order to provide for the lubrication of loose pulleys or similar devices, and for conditions in which a shaft or pulley may frequently be reversed, or in which for other reasons the region of negative pressure in the bearing may be shifted while the shaft is running, I have devised a construction illustrated in Figs. 4, 5 and 6. Referring to these figures, 20 and 22 indicate respectively fast and loose pulleys; the former being rigidly mounted on the shaft 24 and the latter being freely rotatable on a stationary sleeve 26. The sleeve is integral with a casting 27 and both the sleeve and the shaft are supported by a bearing 28 which, for instance, may be a shaft hanger. The shaft is rotatable both in the sleeve and in the bearing. The sleeve, therefore, has both an internal and an external friction surface that must be lubricated. This lubrication is effected by apparatus substantially like that above described in connection with Figs. 1 and 2, except that an apparatus is provided on each side of the bearing and the oil ducts open into the friction surface at points substantially diametrically opposite. These apparatus comprise oil pockets 30 and 31 positioned respectively on the left and right sides of the casting 27, as shown in Fig. 5, oil ducts 32 and 33 connected with said pockets and air ducts 34 and 35 opening respectively into said oil ducts. The pockets 30 and 31 are provided with hinged covers 36 and 37 respectively and the edges of the pockets are notched to allow the air to find its way freely to the air ducts and also to prevent the filling of the reservoir to a point that would cause the oil to run on to the friction surfaces by gravity. Long horizontal oil ducts 38 and 39 are drilled longitudinally of the sleeve at each side through the junction of the respective pairs of oil and air ducts; and several pairs of small cross ducts 40 and 41 intersect respectively the ducts 38 and 39. Two pairs of these cross ducts are drilled through the sleeve and connect the ducts 38 and 39 with both the internal and external friction surfaces of the sleeve. One pair of cross ducts is positioned respectively opposite the air ducts 34 and 35 (as shown in Fig. 5) and open on to the friction surface of the casting 27 to supply oil to this part. Assuming the running conditions to be the same as those described in connection with Figs. 1 and 2, it will be evident that oil will be taken from the pocket 30 and carried through the ducts 32, 38 and 40 to the surface of the shaft 24. If the direction of rotation of the shaft is reversed, then oil will be taken from the opposite pocket 31 and carried through the ducts 33, 39 and 41 to the shaft. Under practically any running conditions suction will be created at one of the ducts 40 or 41 and hence will cause the delivery of oil to the shaft from one pocket or the other.

Assuming the loose pulley 22 to be rotated in a clockwise direction, as seen in Fig. 5, with the belt pull acting vertically downward, the point of greatest pressure of the pulley on the sleeve 26 will be substantially directly above the axis of the sleeve. The "leaving" side of the pulley therefore will be at the right, Fig. 5, and consequently the suction will be created in the region of the ducts 41. Oil, therefore, will be taken from the pocket 31 through the ducts 33, 39 and 41 to the external surface of the sleeve 26. If the direction of rotation is reversed or the conditions are otherwise changed to shift the region of negative pressure to the other side of the sleeve, oil then will be taken from the pocket 30 and carried to the external surface of the sleeve through the ducts 40. This arrangement of ducts upon opposite sides of the bearing enables the apparatus to operate under practically any conditions of direction of rotation, belt pull or load.

The bearing 28 is cored out below the shaft 24 to provide an oil reservoir 44 which may be filled through an oil opening 46 that normally is closed by a cover 48. A passage 50 extends entirely around the shaft and communicates with an aperture 52 opening under the cover 48 to enable the air to escape as it is displaced by the oil during the filling of the oil chamber 44. Two plugs 54 are threaded into holes drilled through the bottom of the bearing 28 to permit the oil chamber 44 to be drained. Ducts 56 and 57 are drilled downwardly through the bearing on opposite sides and open into the oil chamber 44; and ducts 58 and 59 are drilled horizontally through the bearing, intersecting respectively the ducts 56 and 57, and opening onto the friction surface of the bearing. In this construction the bearing surface is grooved longitudinally, as indicated at 60 and 61, these grooves intersecting the ducts 58 and 59. The outer ends of the ducts 56 and 57 are fitted with plugs 62 and 63 drilled to admit air to the ducts. It will be evident that this apparatus operates exactly as does the apparatus shown in Fig. 5, the oil being taken from the reservoir through either the lower portion of the duct 56 and the duct 58 or else through the ducts 57 and 59 to the bearing surface, depending upon the conditions affecting the distribution of pressure about the journal.

The method in accordance with which the present apparatus operates is not claimed in this application Serial No. 683,411 but is made the subject matter of another application filed concurrently herewith.

Having thus described my invention, what I claim as new and desire to secure by Letters Patent of the United States is:—

1. An apparatus of the character described comprising a member having a friction surface, an oil reservoir, a duct leading from said reservoir to said surface and arranged to utilize surface tension to lift oil from the reservoir, and means for causing a current of gas to flow through a portion of said duct to urge the oil therein toward said surface.

2. An apparatus of the character described comprising a member having a friction surface, an oil reservoir, a duct leading from said reservoir to a point on said friction surface and having communication with the atmosphere, said duct being arranged to utilize surface tension to lift oil from the reservoir, and means for creating suction at said point on said friction surface.

3. An apparatus of the character described comprising a member having a friction surface, an oil supply, a duct leading from a point on said surface and between its ends to said oil supply, said supply being so positioned with reference to said point that the oil in traveling along the duct toward said point must be moved through at least a portion of the duct against the influence of gravity, and means for causing a current of gas to flow along a portion of said duct toward said surface.

4. An apparatus of the character described comprising a normally stationary member having a friction surface, a device having a friction surface moving over the friction surface of said member, an oil reservoir, and a duct communicating with the atmosphere and leading from said reservoir to a point between the friction surfaces of said member and said device at which suction is created by the movement of said device, said reservoir being so arranged with reference to said point that the oil in traveling along the duct toward said point must be lifted through at least a portion of the duct against the influence of gravity.

5. An apparatus of the character described comprising a bearing having a friction surface, a member supported for movement on said surface, an oil reservoir, and a duct communicating with the atmosphere and connecting said reservoir with the friction surface of said bearing and arranged to utilize the fluid pressure disturbances created between the friction surfaces of said bearing and member by their relative movement to cause a current of air to pass along said duct toward said friction surface.

6. An apparatus of the character described comprising a bearing, a member supported thereby for rotative movement, an oil reservoir, an oil duct leading from said reservoir to a point on the friction surface of said bearing at which suction is created by the movement of said member, and an air duct opening into said oil duct at a point between the normal level of the oil in said oil duct and said friction surface.

7. An apparatus of the character described comprising a bearing, an oil reservoir formed in said bearing, an oil duct leading from a point on the friction surface of the bearing and opening into said reservoir near its bottom, and an air duct opening into said oil duct at a point above the normal level of the oil in said duct.

8. An apparatus of the character described comprising a bearing, a shaft rotatable in said bearing, an oil reservoir formed in the bearing and open to the atmosphere, a duct leading from a point on the friction surface of the bearing at which suction is created by the motion of said shaft and communicating with the atmosphere, and a second duct leading from the bottom of the reservoir to a point in the first duct above the level of the oil in the reservoir.

9. An apparatus of the character described comprising a bearing having a friction surface, oil ducts opening on to said surface at points separated by a considerable angular distance, means for supplying oil to said ducts, and air ducts opening into said oil ducts at points above the normal level of the surface of the oil in said ducts.

10. An apparatus of the character described comprising a bearing having a friction surface, an oil reservoir, an oil duct connecting said reservoir with an opening on said friction surface between the ends of said surface, said duct including a long substantially horizontal portion, and an air duct opening into said oil duct at a point between the normal level of the oil in said duct and said friction surface.

11. An apparatus of the character described comprising a bearing having a friction surface, an oil reservoir, an oil duct connecting said reservoir with an opening on said surface between the ends of said surface, said duct including a substantially horizontal portion positioned above the normal level of the oil in said reservoir, an air duct opening into said oil duct above the normal level of the oil in the duct and at a point relatively remote from said friction surface, and means for causing a current of air to flow toward said friction surface through said air duct and a portion of said oil duct.

12. An apparatus of the character described comprising a sleeve having internal and external friction surfaces, an oil supply, an oil duct leading from said oil supply and opening on to both of said surfaces, and an air duct opening into said oil duct at a point above the normal level of the surface of the oil in said duct.

13. An apparatus of the character described comprising a stationary sleeve having an internal and an external friction surface, a support for said sleeve, a journal rotatable within said sleeve, a device rotatable on said sleeve, an oil reservoir, an oil duct leading upwardly from said reservoir, having a long substantially horizontal portion and opening on to both of said friction surfaces, and an air duct opening into said oil duct near the end of the horizontal portion remote from the friction surfaces.

14. An apparatus of the character described comprising a bearing having a friction surface, oil ducts opening on to said surface at opposite sides of the bearing, means for supplying oil to said ducts, and air ducts opening respectively into said oil ducts at points between the normal level of the oil in said ducts and said friction surfaces.

15. An apparatus of the character described comprising a bearing having a stationary sleeve projecting therefrom, a shaft positioned in said bearing and extending through said sleeve, a device rotatably mounted on said sleeve, ducts communicating with the atmosphere and opening on to the friction surface of said bearing at opposite sides thereof and on to the internal and external surfaces of said sleeve at its opposite sides, and additional ducts leading from said ducts to an oil supply positioned at a lower level than the first mentioned ducts.

16. An apparatus of the character described comprising a bearing, a shaft supported therein, an oil reservoir in said bearing, an oil duct leading upwardly from a point near the bottom of the reservoir and opening on to the friction surface of the bearing at a point at which negative pressure is created by the movement of the shaft, an air duct opening into said oil duct at a point above the level of the oil therein, and means to prevent the entrance of dirt into said air duct while affording free entrance thereto for the air.

17. An apparatus of the character described comprising a bearing, a member supported thereby for rotative movement, an oil duct opening on to the friction surface of said bearing at a point at which suction is created by the movement of said member, another oil duct opening on to said friction surface substantially opposite to said point, means for supplying oil to said ducts, and an air duct for each of said oil ducts, each air duct opening into its respective oil duct at a point between the normal level of the oil in the oil duct and the point at which it opens on to said friction surface.

In testimony whereof I have signed my name to this specification in the presence of two subscribing witnesses.

ALEXANDER M. ALEXANDER.

Witnesses:
 JOHN H. MCCREADY,
 ELMER B. GRUSH.

Copies of this patent may be obtained for five cents each, by addressing the "Commissioner of Patents, Washington, D. C."

It is hereby certified that in Letters Patent No. 1,157,359, granted October 19, 1915, upon the application of Alexander M. Alexander, of Beverly, Massachusetts, for an improvement in "Lubricating Apparatus," errors appear in the printed specification requiring correction as follows: Page 4, line 40, strike out the words and numerals "Serial No. 683,411"; same page, line 42, before the word "filed" insert the words and numerals *Serial No. 683,411;* and that the said Letters Patent should be read with these corrections therein that the same may conform to the record of the case in the Patent Office.

Signed and sealed this 21st day of March, A. D., 1916.

[SEAL.]

J. T. NEWTON,
*Acting Commissioner of Patents.*

Cl. 64—24.